United States Patent [19]
Shimomura et al.

[11] Patent Number: 5,317,368
[45] Date of Patent: May 31, 1994

[54] IMAGE FORMING APPARATUS CAPABLE OF MAKING SELF-DIAGNOSIS

[75] Inventors: Yoshiki Shimomura; Sadao Tanigawa, both of Osaka; Yasushi Umeda, Tokyo; Tetsuo Tomiyama, Chiba; Hiroyuki Yoshikawa, Chiyoda, all of Japan

[73] Assignee: Mita Industrial Co., Ltd., Japan

[21] Appl. No.: 34,398

[22] Filed: Mar. 19, 1993

[30] Foreign Application Priority Data

Mar. 24, 1992 [JP] Japan .................... 4-66439

[51] Int. Cl.$^5$ ............................ G03G 15/00
[52] U.S. Cl. ................... 355/207; 355/208; 371/15.1; 395/904; 395/912
[58] Field of Search ............ 355/204, 207, 208; 371/15.1, 16.4; 395/900, 904, 912, 61; 364/274.6

[56] References Cited

U.S. PATENT DOCUMENTS

| | | | |
|---|---|---|---|
| 5,127,005 | 6/1992 | Oda et al. | 371/15.1 |
| 5,166,934 | 11/1992 | Tomiyama et al. | 371/16.4 |
| 5,175,585 | 12/1992 | Matsubayashi et al. | 355/208 |
| 5,239,547 | 8/1993 | Tomiyama et al. | 371/16.4 |

Primary Examiner—Joan H. Pendegrass
Attorney, Agent, or Firm—Beveridge, DeGrandi, Weilacher and Young

[57] ABSTRACT

According to the present invention, a self-diagnosis system for an image forming apparatus can make accurate fault diagnosis and is made smaller in size and higher in speed. For that purpose, a fault temporarily developed by the image forming apparatus is limited to a single fault assumption, all states which can exist on the image forming apparatus when the image forming apparatus develops the fault are previously simulated, and the results of the qualitative simulation are stored as a plurality of virtual cases in a virtual case storing portion 12. When the image forming apparatus is operated, detected values of sensors X, Vs and Ds are converted into fuzzy qualitative values, respectively, on the basis of membership functions stored in a membership function generating portion 13. The fuzzy qualitative values are compared with the virtual cases stored in the virtual case storing portion 12, to reason the cause of the fault. Accordingly, any of the virtual cases stored in the virtual case storing portion 12 is selected using the fuzzy qualitative values, thereby to make it possible to accurately specify the fault in a short time.

40 Claims, 13 Drawing Sheets

MEMBERSHIP FUNCTIONS AT THE TIME OF "IMAGE FOG"

MEMBERSHIP FUNCTIONS AT THE TIME OF "IMAGE DENSITY LOW"

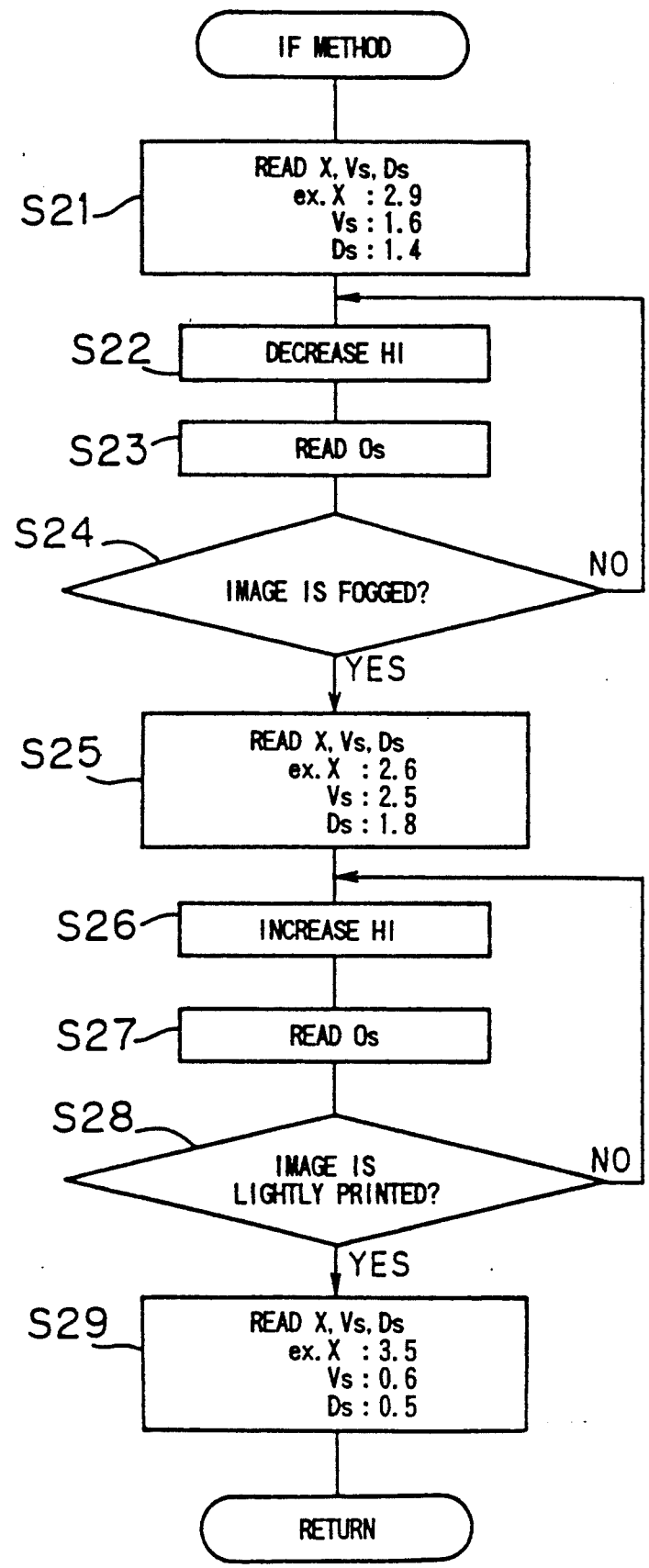

MEMBERSHIP FUNCTIONS AT THE TIME OF "IMAGE FOG" AFTER CORRECTION

MEMBERSHIP FUNCTIONS AT THE TIME OF "IMAGE DENSITY LOW" AFTER CORRECTION

F I G. 12
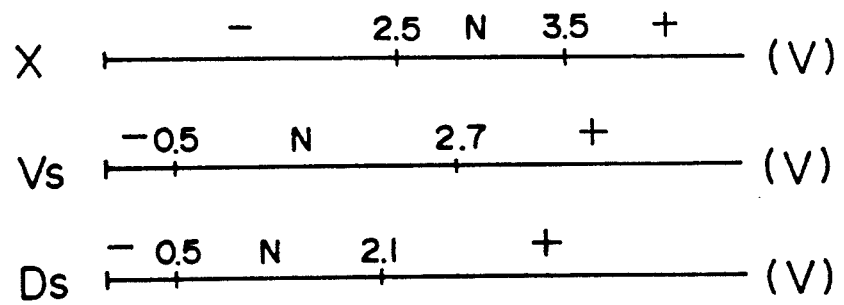

IMAGE FORMING APPARATUS CAPABLE OF MAKING SELF-DIAGNOSIS

BACKGROUND OF THE INVENTION

1. Field of the Invention

The present invention relates generally to an image forming apparatus having a self-diagnosis system. More particularly, the present invention relates to an image forming apparatus so adapted that it can make self-diagnosis of the operating state and the like utilizing artificial intelligence and knowledge engineering which have been being extensively studied in recent years.

2. Description of the Prior Art

In the development field of precision instruments, industrial machines and the like, expert systems utilizing artificial intelligence (so-called AI) techniques have been studied extensively in recent years for the purpose of realizing labor saving in maintenance work and long-term automatic operation. The expert systems include one for making self-diagnosis to judge whether or not an apparatus develops a fault and making self-repair of the fault developed by the apparatus.

However, the conventional expert system (an automatic control system and a fault diagnosis system) only basically operates an actuator corresponding to a sensor on the basis of an output of the sensor. Accordingly, it is not complete as a Self-Maintenance Machine (SMM).

Therefore, the applicant of the present application found a machine control method using diagnosis-repair reasoning on an object model based on qualitative physics and invented a new self-diagnosis and self-maintenance system for an image forming apparatus utilizing such a machine control method, to file a patent application (see, for example, Japanese Patent Laid-Open Gazette No. 130459/1992).

The self-diagnosis and self-maintenance system for an image forming apparatus according to the prior application has the following features:

(1) Detected values of sensors provided for an objective machine (an image forming apparatus) are converted into qualitative values and are used for control.

(2) The structure and the properties of the image forming apparatus are qualitatively expressed using a casual relation network of parameters (a parameter model) representing the property of the image forming apparatus.

(3) The qualitative values obtained by converting the values of the sensors are applied to the parameter model to make qualitative simulation for fault diagnosis and fault repair reasoning.

Specifically, fault diagnosis and fault repair based on the Qualitative Model based System (QMS) are made.

In the self-diagnosis and self-maintenance system according to the prior application of the applicant having such features, even if the image forming apparatus develops a fault accompanied by, for example, the change in structure, the fault can be flexibly coped with. The reason for this is that it is possible to dynamically change a control point and a control loop of the objective machine by utilizing the qualitative simulation.

In the above described self-diagnosis and self-maintenance system according to the prior application, however, there is a possibility that in converting detected values of sensors into qualitative values, errors occur in the conversion. The reason for this is that when the detected value of each of the sensors is converted into the qualitative value, a landmark is defined in a qualitative quantity space, and the detected value is converted into the qualitative value which differs depending on whether the detected value is larger or smaller than the landmark. Accordingly, the landmark must be correctly defined.

However, this landmark may, in some cases, be changed depending on, for example, the environment in which the image forming apparatus is used. In addition, there is a possibility that the detected value of the sensor itself is not necessarily a correct value depending on, for example, the limit of the measurement precision of the sensor.

In the conventional system, therefore, the conversion of the detected value of the sensor into the qualitative value which forms the basis for control varies. As a result, accurate qualitative simulation cannot be made, so that there is a possibility that errors occur in fault diagnosis and fault repair.

Furthermore, it cannot be said that the operation of the above described self-diagnosis and self-maintenance system according to the prior application as a practical machine built-in system is the most suitable in that the scale of the system is large and the speed of execution is low. Therefore, it is desired to decrease the size and increase the speed of the self-diagnosis and self-maintenance system.

SUMMARY OF THE INVENTION

The present invention has been made under the above described background and has for its object to provide an image forming apparatus which is made smaller in size and higher in speed and can make accurate fault diagnosis.

Briefly stated, in the present invention, a fault temporarily developed by an image forming apparatus is limited to a single fault assumption, all states which can exist on the image forming apparatus when the image forming apparatus develops the fault are previously simulated, and the results of the simulation are stored as virtual cases in the image forming apparatus. When the image forming apparatus is operated, fuzzy qualitative values obtained by converting values of sensors are compared with the virtual cases to reason the cause of the fault.

According to the present invention, when the state of the image forming apparatus is self-diagnosed, qualitative simulation need not be made on the basis of the values of the sensors for each diagnosis. All the states which can exist as the result of such qualitative simulation are previously stored as virtual cases. Accordingly, the fault developed by the image forming apparatus can be basically specified in a short time by only comparing fuzzy qualitative values obtained by converting the values of the sensors with the virtual cases.

In the present invention, fault symptoms which can be treated are limited to ones caused by the change in parameters of an objective machine (an image forming apparatus). Many faults developed by the image forming apparatus are faults which can be coped with by the change in parameters. If attempts are made to cope with faults other than the faults caused by the change in parameters, for example, faults accompanied by the change in structure of the image forming apparatus and faults caused by, for example, the limit of the operating range of an actuator, fault diagnosis making use of qualitative simulation based on the above described Qualitative Model based System (QMS) already proposed may be added. Furthermore, in order to cope with the fault repair after, for example, the change in structure of the objective machine more suitably, the Case Based planning System (CBS) already proposed may be made use of. The qualitative simulation based on QMS as well as CBS have been also described in detail in the prior application of the applicant, that is, Japanese Patent Laid-Open Gazette No. 130459/1992 and/or Japanese Patent Application No. 251073/1991. Accordingly, the prior application is incorporated and hence, the description thereof is omitted in the present specification.

Furthermore, according to the present invention, when detected values of sensors provided for an image forming apparatus are converted into qualitative values, the conversion can be made without being affected by, for example, the environment in which the image forming apparatus is used and the detection precision of the sensors and without variation. Accordingly, a fault which causes a fault symptom to appear on the image forming apparatus can be correctly reasoned using fuzzy qualitative values obtained by the conversion.

Furthermore, according to the present invention, it is possible to provide an image forming apparatus having a self-diagnosis and self-maintenance system which is made smaller in size and higher in speed and particularly, an image forming apparatus high in practical applications.

Additionally, according to the present invention, membership functions serving as landmarks which respectively form the basis for conversion of detected values of sensors into qualitative values can be defined with high precision for each image forming apparatus. Moreover, the membership functions can be updated at predetermined timing, thereby to make it possible to provide an image forming apparatus capable of always accurately converting the detected values of the sensors into the qualitative values and eliminating the possibility of erroneous diagnosis and erroneous repair.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flow chart showing the contents of processing of an Imitation Fault method (IF method).

FIG. 12 is a diagram showing one example of landmarks (which respectively use no membership functions) before correction using the IF method.

DESCRIPTION OF THE PREFERRED EMBODIMENTS

A system for self-diagnosis and self-maintenance which is applied to a small-sized electrophotographic copying machine will be described as one embodiment.

Figure 1:
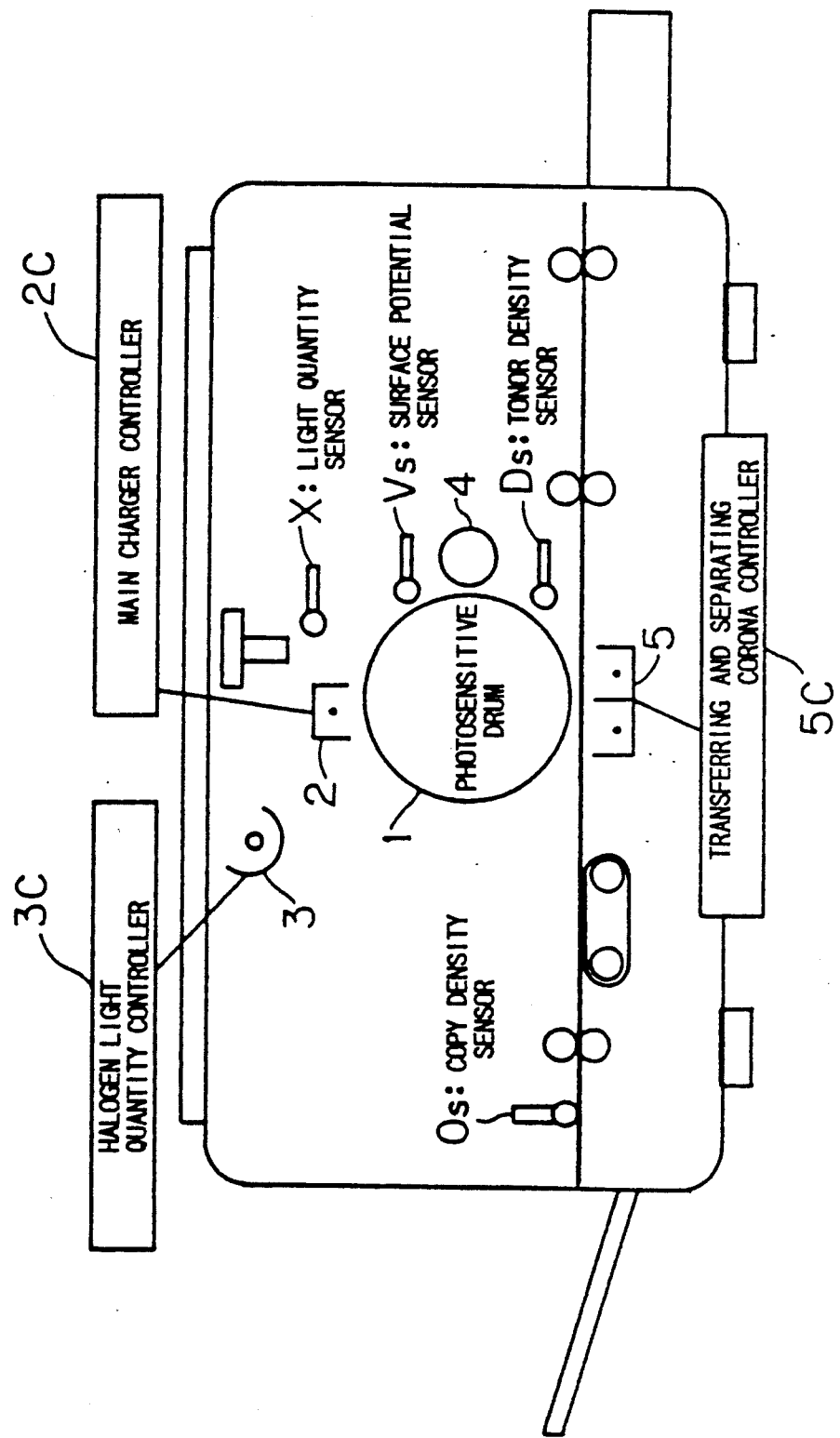
FIG. 1 is a diagram showing the construction of a small-sized electrophotographic copying machine to which the present invention is applied.

FIG. 1 is a diagram showing the construction of a small-sized electrophotographic copying machine to which the present invention is applied, which illustrates only portions related to the present invention. In FIG. 1, reference numeral 1 denotes a photosensitive drum, reference numeral 2 denotes a main charger, reference numeral 3 denotes a halogen lamp for document illumination, reference numeral 4 denotes a developing device, and reference numeral 5 denotes a transferring and separating corona discharger.

A main charger controller 2C for changing a discharge voltage of the main charger 2 is connected to the main charger 2. In addition, a halogen light quantity controller 3C for controlling the quantity of light of the halogen lamp 3 is connected to the halogen lamp 3. Furthermore, a transferring corona discharger controller 5C for controlling a discharge voltage of the transferring and separating corona discharger 5, that is, a transfer voltage between the photosensitive drum 1 and copy paper is connected to the transferring and separating corona discharger 5.

In the electrophotographic copying machine, it is the most important to determine whether or not a copy image obtained is finished neatly (normal). In the present embodiment, therefore, it is automatically determined whether the copy image obtained is normal or the copy image is fogged or is lightly printed. If the copy image obtained is fogged or is lightly printed, the cause of such a symptom, that is, a fault is traced. Description is made by taking as an example a device for making self-maintenance of the fault.

In the present embodiment, there are provided sensors, for example, four sensors, that is, a light quantity sensor X for measuring the quantity of light to which the photosensitive drum 1 is exposed (that is, the quantity of light of the halogen lamp 3), a surface potential sensor Vs for measuring a surface potential of the photosensitive drum 1 after the exposure, a toner density sensor Ds for detecting the toner density on the photosensitive drum 1, and a copy density sensor Os. The copy density sensor Os is for detecting the density of a copy image formed by the electrophotographic copying machine. It is judged whether the image is normal or the image is fogged or is lightly printed as a fault symptom on the basis of a detection output Os of the copy density sensor Os.

Figure 2:
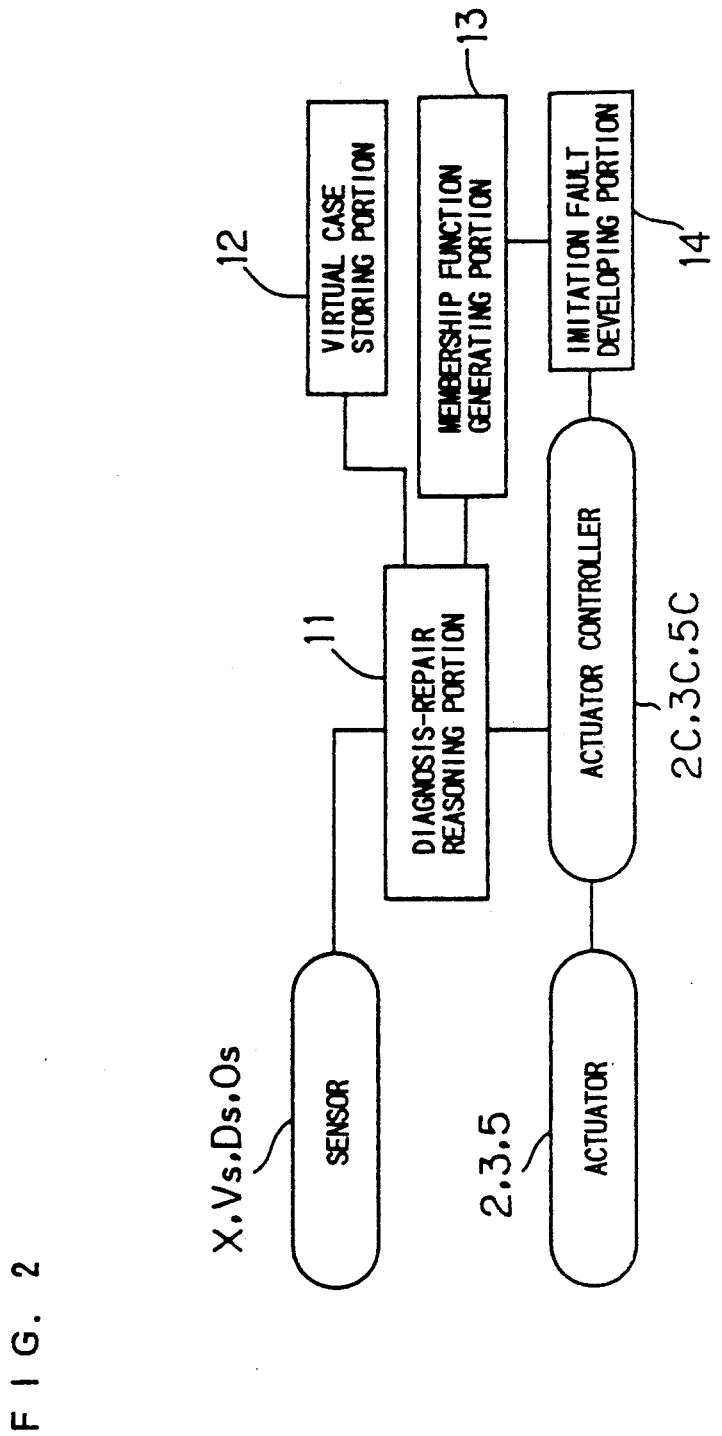
FIG. 2 is a diagram showing functional blocks of the small-sized electrophotographic copying machine shown in FIG. 1.

FIG. 2 is a diagram showing functional blocks of the small-sized electrophotographic copying machine shown in FIG. 1, which illustrates only portions related to the present invention. In FIG. 2, a block with rounded corners indicates a so-called hardware function, and a block with sharp corners indicates a so-called software function (program processing executed in a computer). The functions are classified into the hardware functions and the software functions by way of example. The software function may be realized by hardware.

A correspondence between the functional blocks shown in FIG. 2 and the construction of the electrophotographic copying machine shown in FIG. 1 is as follows. Specifically, a sensor shown in FIG. 2 comprises the light quantity sensor X, the surface potential sensor Vs, the toner density sensor Ds, and the copy density sensor Os shown in FIG. 1. An actuator controller shown in FIG. 2 comprises the main charger controller 2C, the halogen light quantity controller 3C, and the transferring corona discharger controller 5C shown in FIG. 1. An actuator shown in FIG. 2 comprises the main charger 2, the halogen lamp 3, and the transferring and separating corona discharger 5 shown in FIG. 1.

In FIG. 2, the software functional blocks are classified into, for example, four functional blocks, that is, a diagnosis-repair reasoning portion 11, a virtual case storing portion 12, a membership function generating portion 13, and an imitation fault developing portion 14.

Virtual cases exemplified in Table 1 and Table 2 which are previously created are stored in the virtual case storing portion 12. The virtual cases are states which can exist on the electrophotographic copying machine out of the results of the qualitative simulation of the state of the electrophotographic copying machine at the time when the electrophotographic copying machine develops a fault under the condition that a fault temporarily developed by the electrophotographic copying machine is limited to a single fault assumption.

TABLE 1

| | image fog | | |
| --- | --- | --- | --- |
| | X | Vs | Ds |
| faulty H1 | −1.0 | +1.0 | +1.0 |
| faulty Vn | N 1.0 | +1.0 | +1.0 |
| faulty Vb | N 1.0 | N 1.0 | +1.0 |
| faulty Vt | N 1.0 | N 1.0 | N 1.0 |

TABLE 2

| | image density low | | |
| --- | --- | --- | --- |
| | X | Vs | Ds |
| faulty H1 | +1.0 | −1.0 | −1.0 |
| faulty Vn | N 1.0 | −1.0 | −1.0 |
| faulty Vb | N 1.0 | N 1.0 | −1.0 |
| faulty Vt | N 1.0 | N 1.0 | N 1.0 |

The virtual cases can be created using the qualitative simulation described in, for example, the above described prior application of the applicant (Japanese Patent Laid-Open Gazette No. 130459/1992).

Figure 3:
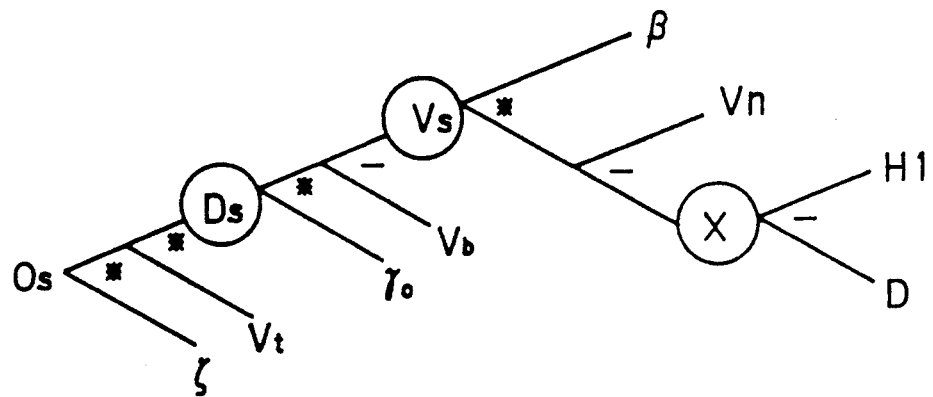
FIG. 3 illustrates a simplified parameter model of the small-sized electrophotographic copying machine shown in FIG. 1.

A method of the qualitative simulation will be briefly described as follows. When this electrophotographic copying machine is grasped from a physical point of view and is represented as a combination of a plurality of elements, and behaviors and attributes of the respective elements as well as the combinational relationship among the elements are represented qualitatively using parameters, a parameter model shown in FIG. 3 is obtained. The parameter model shown in FIG. 3 is a simplified model obtained by extracting only parameters related to a parameter of the copy density (hereinafter referred to as a copy density parameter) Os.

In the parameter model shown in FIG. 3,

H1 represents a parameter of the quantity of light of the halogen lamp 3,

D represents a parameter of the optical density of a document,

X represents a parameter of the quantity of light to which the photosensitive drum 1 is exposed, $\beta$ represents a parameter of the sensitivity of the photosensitive drum 1, Vn represents a parameter of a surface potential of the photosensitive drum 1 after main charging, Vs represents a parameter of a surface potential of the photosensitive drum 1 after exposure, Vb represents a parameter of a developing bias, $\gamma o$ represents a parameter of the toner sensitivity, Ds represents a parameter of the image density (toner density) on a drum, Vt represents a parameter of a transfer voltage, and $\zeta$ represents a parameter of the paper sensitivity. The parameters D, $\beta$, $\gamma o$ and $\zeta$ out of the foregoing parameters are regarded as fixed values because there is little possibility of variation. Therefore, it can be presumed that the change of the copy density parameter Os is caused by the change of any one of the parameters H1, Vn, Vb and Vt. When any one of the four parameters H1, Vn, Vb and Vt is changed to change the parameter Os, the change of the parameter Os inevitably changes the three sensing object parameters X, Vs and Ds (the parameters enclosed with circles in FIG. 3) (only when it is caused by the change of the parameter Vt, however, any of the parameters X, Vs and Ds is not changed).

The qualitative simulation for creating virtual cases is based on the assumption that a fault temporarily developed by the electrophotographic copying machine is a single fault assumption. Therefore, the states of the sensing object parameters X, Vs and Ds differ with respect to each of cases where H1 (halogen lamp) is faulty, Vn (main charger) is faulty, Vb (developing bias) is faulty, and Vt (transferring corona discharger) is faulty. Therefore, the states are reasoned and respectively stored as virtual cases.

The concrete example of the method of creating virtual cases will be described using the parameter model shown in FIG. 3. It is assumed that the copy density becomes abnormal, so that Os becomes high (+). If the cause of Os high (+) is H1=low (−), X becomes low (−). In addition, if the cause of Os=high (+) is the change of Vn, Vb or Vt, X is normal (N). The reason for this is that the creation of the virtual cases is based on the assumption that a fault temporarily developed by the electrophotographic copying machine is a single fault. In the case of Os=high (+), therefore, X must be normal (N) or high (+) and cannot be low (−).

On the other hand, if the fundamental cause of Os=high (+) is H1, H1 must be low (−). The change of H1 should affect X, Vs and Ds on the parameter model. The reason for this is that if H1 is changed to such a degree that the change does not affect X, Vs and Ds, Os is not also changed as the result of the change. If H1 is the fundamental cause of a fault symptom, that is, a fault, therefore, X, Vs and Ds cannot be normal (N).

The virtual cases are thus created on the assumption that when the copy density parameter Os is abnormal, (1) the cause is inevitably the change of a single parameter, and (2) the change of the parameter inevitably affects the sensing object parameters (the parameters enclosed with circles in FIG. 3). If the virtual cases are created under the conditions (1) and (2), only states which can actually occur on the electrophotographic copying machine are obtained as virtual cases.

The concrete examples of the virtual cases are as shown in Table 1 and Table 2. Table 1 shows four virtual cases in a case where a fault symptom "image fog" appears on the electrophotographic copying machine. Table 1 is found in the following manner. When a copy image formed by the electrophotographic copying machine is fogged, it can be presumed from the parameter model shown in FIG. 3 that the cause of "image fog" is faulty Hl (halogen lamp), faulty Vn (main charger), faulty Vb (developing bias) or faulty Vt (transferring corona discharger).

In this case, the contents of the above described fault are applied to two conditions (1) the fault is limited to a single fault assumption and (2) the change of Hl also inevitably affects the other parameters. When the cause of "image fog" is faulty Hl, the parameter X should be low (−), the parameter Vs should be high (+), and the parameter Ds should be high (+), and the parameters cannot assume the other states.

Furthermore, when the cause of "image fog" is faulty Vn, the parameter X should be normal (N), the parameter Vs should be high (+), and the parameter Ds should be high (+), and the parameters cannot assume the other states.

Additionally, when the cause of "image fog" is faulty Vb, the parameter X should be normal (N), the parameter Vs should be normal (N), and the parameter Ds should be high (+), and the parameters cannot assume the other states.

Furthermore, when the cause of "image fog" is faulty Vt, the parameter X should be normal (N), the parameter Vs should be normal (N), and the parameter Ds should be normal (N), and the parameters cannot assume the other states.

A numerical value "1.0" added to the state of each of the parameters in Table 1 indicates the degree in a fuzzy membership function as described later. The advantages of introducing the fuzzy membership function will be described later.

Similarly, when the density of copies obtained by the electrophotographic copying machine is low, it is presumed that the cause is faulty Hl (halogen lamp), faulty Vn (main charger), faulty Vb (developing bias), or faulty Vt (transferring corona discharger) from the parameter model shown in FIG. 3, and the states of the sensing object parameters X, Vs and Ds in a case where each of the faults occurs are as shown in Table 2.

The above described virtual cases exemplified in Table 1 and Table 2 are previously found by qualitative simulation and stored in the virtual case storing portion 12 for each fault symptom.

The virtual case storing portion 12 also stores repair methods previously reasoned for the faults in each of the fault symptoms. For example, the following repair method as shown in Table 3 is stored for the fault "faulty Hl" in the fault symptom "image fog".

TABLE 3 faulty Hl

TABLE 3-continued

| (X: −1.0, Vn: +1.0, Ds: +1.0) | | |
|---|---|---|
| repair method | No. 1 | Hl: UP |
| | No. 2 | Vn: down |

Repair methods are also respectively stored for the other faults.

One feature of the present invention is that such virtual cases are previously calculated using qualitative simulation and are held. This saves time and labor required to make qualitative simulation of the state of the electrophotographic copying machine for each fault diagnosis, thereby to make it possible to increase the speed of processing.

The above described virtual case storing portion 12 may be replaced with an outputting portion for generating sets of qualitative values of characteristic parameters representing the state of each of the faults (hereinafter referred to as "sets of qualitative values") exemplified in Table 1 and Table 2 by qualitative simulation to output the same.

When the outputting portion is provided, the above described sets of qualitative values exemplified in Table 1 and Table 2 are found by qualitative simulation in the outputting portion as required.

The sets of qualitative values may also include repair methods reasoned for each fault in each of fault symptoms. For example, the sets of qualitative values can include a repair method as shown in the table 3 for the fault "faulty Hl" in the fault symptom "image fog". This repair method is also found by the qualitative simulation.

Membership functions respectively used in converting detected values of the light quantity sensor X, the surface potential sensor Vs and the toner density sensor Ds into qualitative values are stored for each fault symptom in the membership function generating portion 13 shown in FIG. 2, as illustrated in FIGS. 4(A) through 4(C) and 5(A) through 5(C). It is known that the membership function is a function for defining the degree (grade) to which a given element belongs to a set in the fuzzy theory.

Figure 4A:
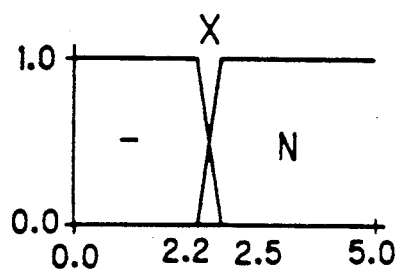
FIGS. 4(A) through 4(C) are diagrams showing membership functions of X, Vs and Ds used at the time of "image fog".
Figure 4B:
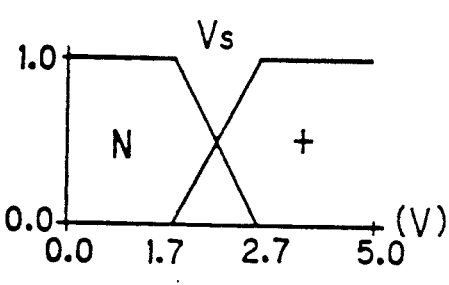
Figure 4C:
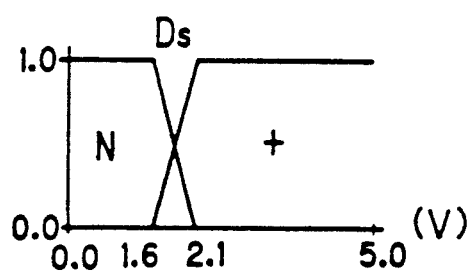

For example, FIGS. 4(A) through 4(C) show membership functions of X, Vs and Ds used at the time of a fault symptom "image fog". When it is judged in the diagnosis-repair reasoning portion 11 (see FIG. 2) that an image on copies outputted from the electrophotographic copying machine is fogged on the basis of an output of the copy density sensor Os (see FIG. 1), detected values at that time of the light quantity sensor X, the surface potential sensor Vs and the toner density sensor Ds are converted into qualitative values, respectively, on the basis of the membership functions shown in FIGS. 4(A) through 4(C) are stored in the membership function generating portion 13. For example, when the detected quantitative value of the light quantity sensor X is less than 2.2 (V), it is converted into a qualitative value of the parameter X (−:1.0, N: 0.0). When the detected quantitative value of the light quantity sensor X is 2.3 (V), it is converted into a qualitative value of the parameter X (−:0.7, N:0.3). In addition, when the detected quantitative value of the light quantity sensor X is not less than 2.5 (V), it is converted into a qualitative value of the parameter X (−:0.0, N: 1.0).

Similarly, the detected quantitative value of the surface potential sensor Vs and the detected quantitative value of the toner density sensor Ds are also converted into qualitative values, respectively, using the membership function of Vs and the membership function of Ds shown in FIGS. 4(A) through 4(C).

Figures 5A, 5B:
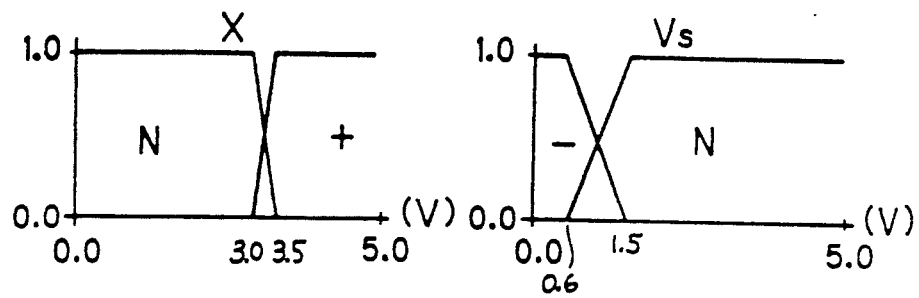
FIGS. 5(A) through 5(C) are diagrams showing membership functions of X, Vs and Ds used at the time of "image density low".
Figure 5C:
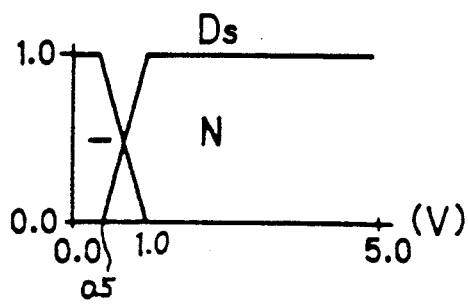

Furthermore, when it is judged that an image is lightly printed, detected quantitative values of the light quantity sensor X, the surface potential sensor Vs and the toner density sensor Ds are converted into qualitative values, respectively, using the membership functions of X, Vs and Ds shown in FIGS. 5(A) through 5(C).

Description is now made of a method of setting the membership functions shown in FIGS. 4(A) through 4(C) or FIGS. 5(A) through 5(C).

It is generally necessary to define a landmark in a quantity space so as to convert a detected quantitative value of a sensor into a qualitative value. If the change in the normal state of the electrophotographic copying machine after fault repair and the limit of the measurement precision of the sensor are considered, it is not easy to determine the landmark as static one. If the landmark is determined as static one and the determination is in error, the conversion of the value of the sensor into the qualitative value which is a premise of this control is not accurately made, so that the possibility of erroneous diagnosis and erroneous repair is increased in the subsequent fault diagnosis and fault repair.

In the present embodiment, therefore, landmarks are defined for each fault symptom, and the landmarks are respectively defined using fuzzy membership functions, as described above.

If detected quantitative values of sensors are converted into qualitative values respectively using membership functions corresponding to a fault symptom, the reading errors of the sensors and the variation in output of the sensors due to, for example, the change in the environment in which the electrophotographic copying machine is used can be coped with flexibly and suitably.

Furthermore, if the fuzzy membership functions are respectively introduced in converting the detected quantitative values of the sensors into the qualitative values, a problem concerning a correspondence between the measured quantitative values and the qualitative values which depends on, for example, the measurement precision of the sensors and the change in the environment in which the electrophotographic copying machine is used can be flexibly coped with, thereby to make it difficult to cause errors in converting the values of the sensors into the qualitative values.

Meanwhile, in this stage, parameters which are qualitative values are not necessarily immediately applied to virtual cases and used for selecting any fault. In order to select one of a plurality of faults included in the virtual cases, a fault in the virtual cases whose state is the closest to the state of the parameters is found on the basis of a predetermined formula, as described later.

Returning to FIG. 2, the functional blocks of the electrophotographic copying machine comprise the imitation fault developing portion 14.

The imitation fault developing portion 14 carries out an imitation fault method (IF method). The IF method is a method of forcing the electrophotographic copying machine to develop a fault by operating an actuator in the early stages before shipping the electrophotographic copying machine, after fault repair or at arbitrary timing based on manual input and dynamically determining landmarks respectively using sensor information at the time when the image forming apparatus is in a normal state before developing the fault and at the time when the image forming apparatus develops the fault The membership functions shown in FIGS. 4(A) through 4(C) and FIGS. 5(A) through 5(C) are determined using this IF method. If the IF method is used, the landmarks in the qualitative quantity space which are respectively required to convert the detected quantitative values of the sensors into the qualitative values can be dynamically determined for each electrophotographic copying machine which is an actual controlled object, thereby to make it possible to define the landmarks which respectively form the basis for the conversion into qualitative values with high precision for each electrophotographic copying machine.

Furthermore, if the IF method is used, landmarks defined when the electrophotographic copying machine is in an initial state can be corrected for each completion of fault repair, as described later, thereby to make it possible to always update the landmarks in the quantity space to suitable values in conformity with the change with time of the electrophotographic copying machine, the change in the environment in which the electrophotographic copying machine is used, and the like.

In the present embodiment, the landmarks in the quantity space are respectively defined using the fuzzy membership functions, as shown in FIGS. 4(A) through 4(C) and FIGS. 5(A) through 5(C). Specifically, the landmarks are fuzzified. If the landmarks are fuzzified, the reading errors of the sensors and the change of the landmarks due to disturbances such as the change in the environment can be flexibly coped with. However, the present invention is not directed to only a structure using the fuzzy theory when the landmarks are defined. For example, the present invention also covers a structure using the above described IF method in defining landmarks in a quantity space which are respectively required in converting values of sensors into qualitative values which is disclosed in, for example, Japanese Patent Laid-Open Gazette No. 130459/1992 which is the prior application of the applicant. The reason for this is that the landmarks can be dynamically determined in themselves, that is, even if the landmarks are not fuzzified by using the IF method, to obtain the most suitable landmarks.

Figure 6:
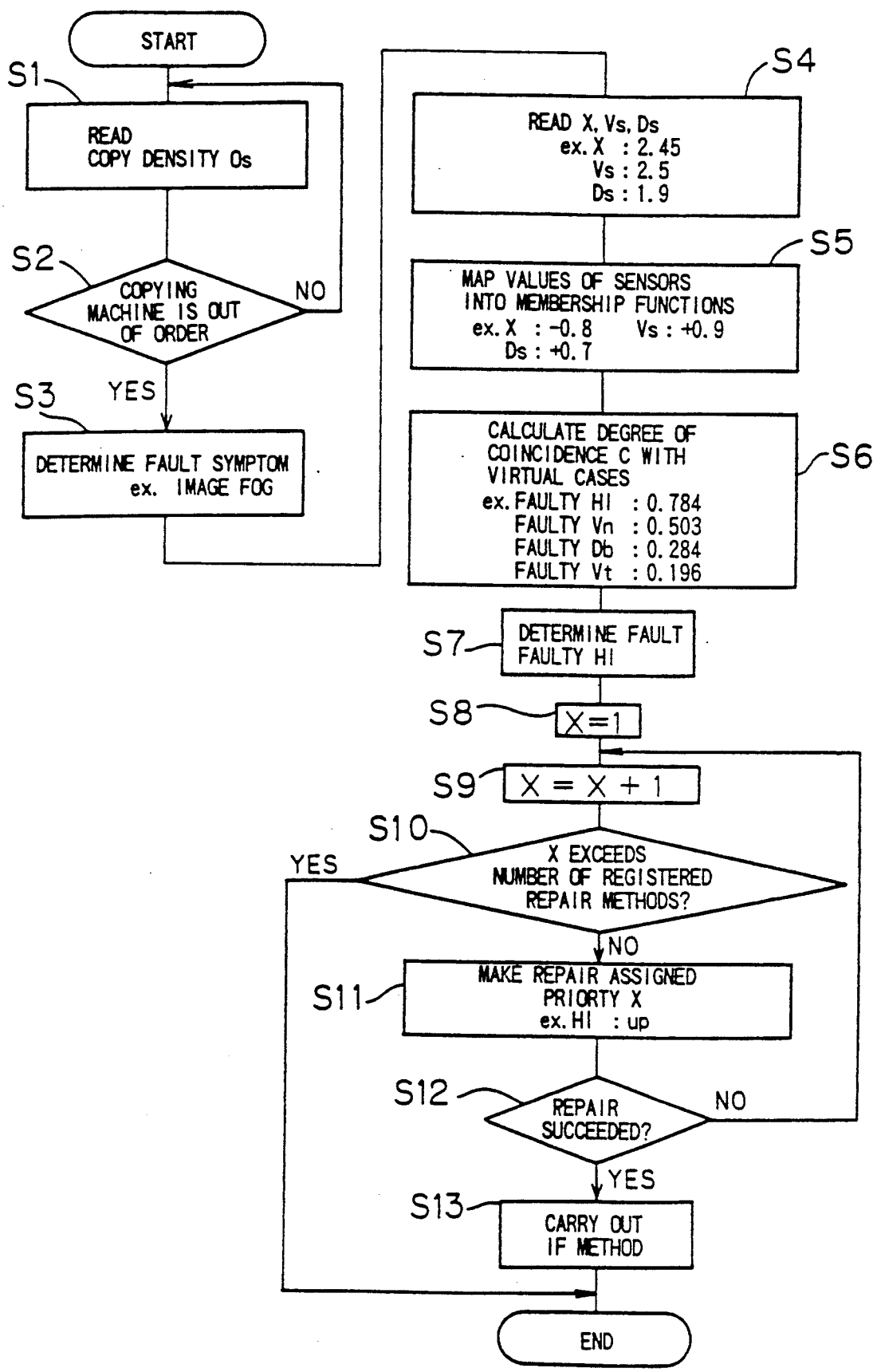
FIG. 6 is a flow chart showing an algorithm for fuzzy qualitative reasoning.

FIG. 6 is a flow chart showing an algorithm for fuzzy qualitative reasoning (FQR) performed in the diagnosis-repair reasoning portion 11 shown in FIG. 2. Description is now made of fault diagnosis and fault repair processing in this electrophotographic copying machine along the flow of FIG. 6.

When a control operation is started, a detected value of the copy density sensor Os is read by the diagnosis-repair reasoning portion 11 (step S1). The copy density Os read is compared with a predetermined reference value, to judge whether or not the electrophotographic copying machine develops a fault (step S2).

Figure 7:
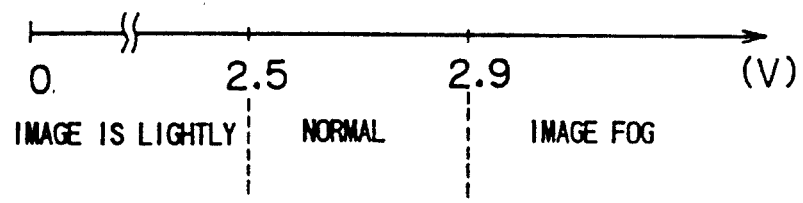
FIG. 7 is a diagram showing one example of a reference value for judging the presence or absence of a fault.

For example, it is assumed that the condition shown in FIG. 7 is stored as a reference value. Specifically, it is assumed that such a reference value for judging the presence or absence of a fault is set that an image is lightly printed when the detected voltage is less than 2.5 (V), an image is natural when the detected voltage is not less than 2.5 (V) and less than 2.9 (V), and an image is fogged when the detected voltage is not less than 2.9 (V). At this time, if the detected value of the copy density sensor Os is 3.1 (V), it is judged that a fault symptom "image fog" appears (step S3).

Although the processing in the above described steps S1 to S3 is processing performed because the electrophotographic copying machine according to the present embodiment is a machine for automatically judging the presence or absence of a fault, the processing may be manually performed.

When the processing in the steps S1 to S3 is manually performed, the copy density sensor Os need not be provided. In the manual processing, a service man or the like may judge from copies outputted from the electrophotographic copying machine that an image on the copies is fogged, for example. In this case, "image fog" is inputted as a fault symptom to the electrophotographic copying machine. The fault symptom may be allowed to be inputted by a ten key or the like ordinarily provided for the electrophotographic copying machine.

If it is judged in the step S3 that a fault symptom "image fog" appears, detected values of the light quantity sensor X, the surface potential sensor Vs and the toner density sensor Ds are then read (step S4). It is assumed that the read values of the sensors X, Vs and Ds are respectively 2.45 (V), 2.5 (V) and 1.9 (V). The read values of the sensors are applied to the membership functions (see FIGS. 4(A) through 4(C) at the time of "image fog" stored in the membership function generating portion 13, respectively, to determine temporary qualitative values (step S5). In this concrete example, the values of the sensors X, Vs and Ds, i.e., 2.45, 2.5 and 1.9 are respectively applied to the membership functions shown in FIGS. 4(A) through 4(C) to obtain a set of temporary qualitative values p (−0.8, 0.9, +0.7).

That is, the following expression is obtained:

$$(X, Vs, Ds) = (2.45, 2.5, 1.9)$$
$$= p(-0.8, +0.9, +0.7)$$

Meanwhile, if not conversion of detected values of sensors into fuzzy qualitative values using membership functions but conversion of detected values of sensors into qualitative values based on particular landmarks is performed, the following expression is obtained:

$$(X, Vs, Ds) = (-, +, +)$$

The degree of coincidence C of each of the faults listed in the virtual cases in the fault symptom "image fog" shown in Table 1 and the set of temporary qualitative values found in the step S5 is then calculated (step S6). The degree of coincidence C is calculated in the following manner.

If the faults listed in the virtual cases in the fault symptom "image fog" are first represented in a three-dimensional quantity space of X, Vs and Ds, the following expressions are obtained:

faulty H1: (X, Vs, Ds) = f1 (−1.0, +1.0, +1.0)
faulty Vn: (X, Vs, Ds) = (N 1.0, +1.0, +1.0)
    = f2 (−0.0, +1.0, +1.0)
faulty Vb: (X, Vs, Ds) = (N 1.0, N 1.0, +1.0)
    = f3 (−0.0, +0.0, +1.0)
faulty Vt: (X, Vs, Ds) = (N 1.0, N 1.0, N 1.0)
    = f4 (−0.0, +0.0, +0.0)

Figure 8:
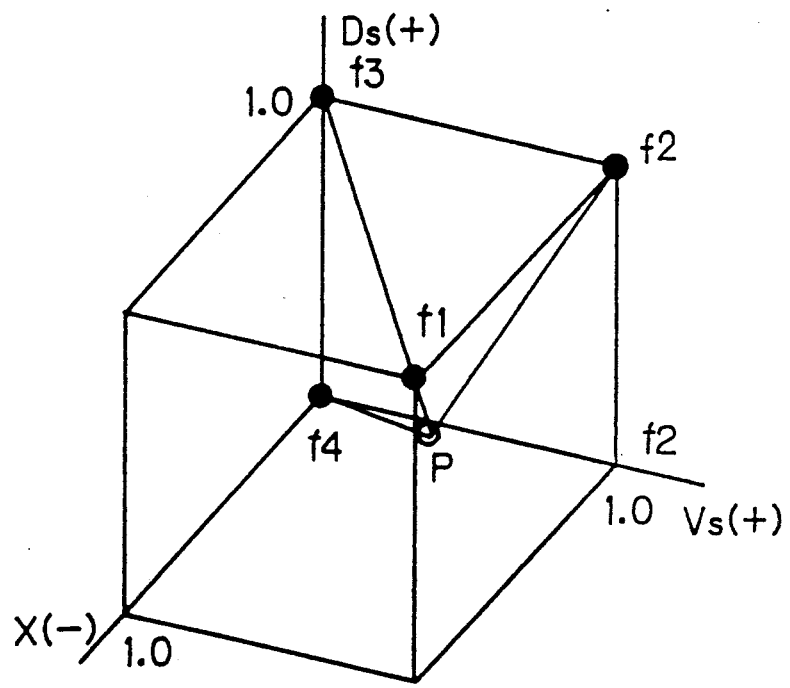
FIG. 8 is a diagram showing the representation of faults listed in virtual cases in a fault symptom "image fog" in a three-dimensional quantity space of X, Vs and Ds.

If the above described expressions are illustrated, a three-dimensional qualitative quantity space shown in FIG. 8 is obtained. In FIG. 8, f1, f2, f3 and f4 are respectively positions where H1 is faulty, Vn is faulty, Vb is faulty and Vt is faulty.

Furthermore, the set of temporary qualitative values p (−0.8, +0.9, +0.7) found in the step S5 is positioned in Point p in the three-dimensional space shown in FIG. 8.

The distances D from Point p to the positions f1, f2, f3 and f4 where the respective faults listed in the virtual cases occur are then calculated as follows:

$$D(f1) = \sqrt{\{(0.8-1.0)^2 + (0.9-1.0)^2 + (0.7-1.0)^2\}} = 0.374$$

$$D(f2) = \sqrt{\{(0.8-0.0)^2 + (0.9-1.0)^2 + (0.7-1.0)^2\}} = 0.86$$

$$D(f3) = \sqrt{\{(0.8-0.0)^2 + (0.9-0.0)^2 + (0.7-1.0)^2\}} = 1.241$$

$$D(f4) = \sqrt{\{(0.8-0.0)^2 + (0.9-0.0)^2 + (0.7-0.0)^2\}} = 1.393$$

The distances D calculated by the foregoing expressions are normalized, respectively, to calculate the degrees of coincidence C. The distances D are normalized on the basis of the following formula:

$$C = 1 - D/\sqrt{n}$$

(where n is the number of sensing parameters: n=3 in this case)

Consequently, the respective degrees of coincidence C are as follows:

$$C(f1) = 1 - 0.374/\sqrt{3} = 0.784$$

$$C(f2) = 1 - 0.86/\sqrt{3} = 0.503$$

$$C(f3) = 1 - 1.241/\sqrt{3} = 0.284$$

$$C(f4) = 1 - 1.393/\sqrt{3} = 0.196$$

As a result, the position f1 which is the nearest from Point p, that is, f1 (faulty H1) having the highest degree of coincidence C is determined as a fault candidate (step S7).

The above described formula for calculating the degrees of coincidence C is represented by the following general formulas:

$$C = 1 - \sqrt{\{C(p1)^2 + C(p2)^2 + \ldots + C(pn)^2\}}/\sqrt{n}$$

$$C(pn) = Gm(qn) - Gs(qn)$$

(where C is the degree of coincidence with respect to the whole model, pn is a variable which can be measured, C (pn) is the degree of coincidence with respect to the variable pn, qn is a qualitative value which the variable pn can take, Gm (qn) is the grade of the qualitative value qn in the faulty model, Gs (qn) is the grade of the qualitative value qn in the measured value)

When not conversion into fuzzy qualitative values using membership functions but ordinary conversion into qualitative values based on particular landmarks is performed, the calculation of the degrees of coincidence C in the step S6 is omitted, so that it is immediately determined that the fault is faulty H1 from the following expression:

$$(X, Vs, Ds) = (-, +, +)$$

It is determined in the step S7 that the fault is faulty H1. Accordingly, the repair method (the method shown in Table 3) corresponding to the fault "faulty H1" in the fault symptom "image fog" which is stored in the virtual case storing portion 12 is carried out in accordance with its priority. In order to carry out the repair methods in the order of priorities, a counter x is cleared in the step S8, and the counter x is set to 1 in the step S9. When it is confirmed that the value of the counter x does not exceed the number of registered repair methods stored (step S10), a repair method assigned a priority of the value of the counter x out of the repair methods stored (for example, a repair method H1 : UP assigned the highest priority (increase the quantity of light of the halogen lamp) when the first repair is made) is carried out (step S11).

It is judged whether or not this repair succeeded (step S12). It is judged by making copies after the repair and reading the density of the copies outputted as the result of copying using the copy density sensor Os whether or not the repair succeeded.

When the repair did not succeed, the program is returned to the step S9. In the step S9, a count value of the counter x is incremented by one, so that a repair method assigned the subsequent priority is carried out. For example, a repair method Vn:DOWN assigned the second-highest priority (decrease the voltage of the main charger) is carried out. If a repair method assigned the subsequent priority is not registered, processing is terminated at the time point.

If it is judged in the step S12 that the repair succeeded, the program proceeds to the step S13. In the step S13, the IF method is carried out, to terminate processing.

The contents of processing of the IF method performed in the above described step S13 are shown in FIG. 9.

Referring now to FIG. 9, the IF method will be described in detail.

If the fault repair succeeded, the detected values of the light quantity sensor X, the surface potential sensor Vs and the toner density sensor Ds are read by the diagnosis-repair reasoning portion 11 (step S21). It is assumed that the read values of the respective sensors X, Vs and Ds are, for example, 2.9 (v), 1.6 (V) and 1.4 (V).

The halogen light quantity controller 3C is then operated by the imitation fault developing portion 14 (see FIG. 2), to decrease the quantity of light of the halogen lamp 3 (step S22). Every time the quantity of light of the halogen lamp 3 is decreased a very small quantity at a time, the electrophotographic copying machine is caused to perform a copying operation. The copy density obtained at that time is detected by the copy density sensor Os, and its detected value is read (step S23). The detected value of the copy density sensor Os is checked with the above described reference value for judging the presence or absence of a fault shown in FIG. 7, so that processing for decreasing the quantity of light of the halogen lamp 3 is stopped when the value of the copy density sensor Os reaches a reference value at which an image is fogged (step S24).

The detected values of the light quantity sensor X, the surface potential sensor Vs and the toner density sensor Ds in a case where the quantity of light of the halogen lamp 3 is decreased until an image is fogged are read (step S25). It is assumed that the read values of the respective sensors X, Vs and Ds are, for example, 2.6 (V), 2.5 (V) and 1.8 (V).

Figures 10A, 10B:
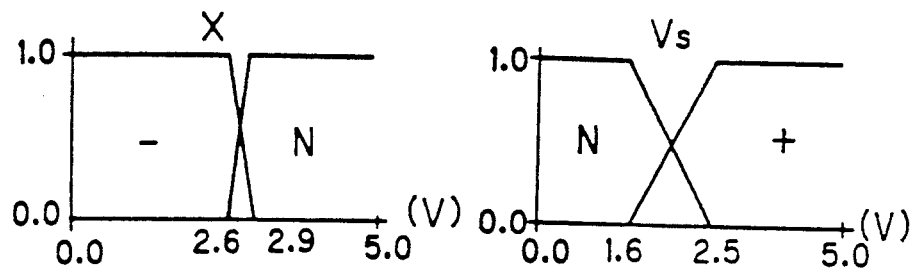
FIGS. 10(A) through 10(C) are diagrams showing membership functions used at the time of "image fog" after correction using the IF method.
Figure 10C:
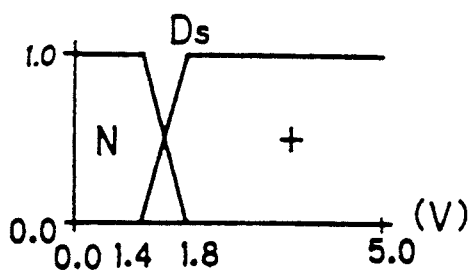

The detected values of the sensors X, Vs and Ds after the fault repair which are read in the step S21 and the detected values of the sensors X, Vs and Ds at the time point where an image is fogged which are read in the step S25 are applied to the membership function generating portion 13, to respectively generate membership functions at the time of "image fog". Specifically, the values read in the step S21 are regarded as landmarks at the time when an image is normal, and the values read in the step S25 are regarded as landmarks at the time point where an image is fogged. The membership functions at the time of "image fog" as shown in FIGS. 4(A) through 4(C) are corrected to membership functions as shown in FIGS. 10(A) through 10(C).

The halogen light quantity controller 3C is then operated by the imitation fault developing portion 14, to increase the quantity of light of the halogen lamp 3 (step S26). Every time the quantity of light of the halogen lamp 3 is increased a very small quantity at a time, the electrophotographic copying machine is caused to make copies. The copy density obtained at that time is detected by the copy density sensor Os, and its value is read (step S27).

The read value of the copy density sensor Os is checked with the reference value for judging the presence or absence of a fault shown in FIG. 7. When an image is lightly printed (step S28), detected values at that time of the light quantity sensor X, the surface potential sensor Vs and the toner density sensor Ds are read (step S29). It is assumed that the read values of the sensors X, Vs and Ds are, for example, respectively 3.5 (V), 0.6 (V) and 0.5 (V).

Figures 11A, 11B:
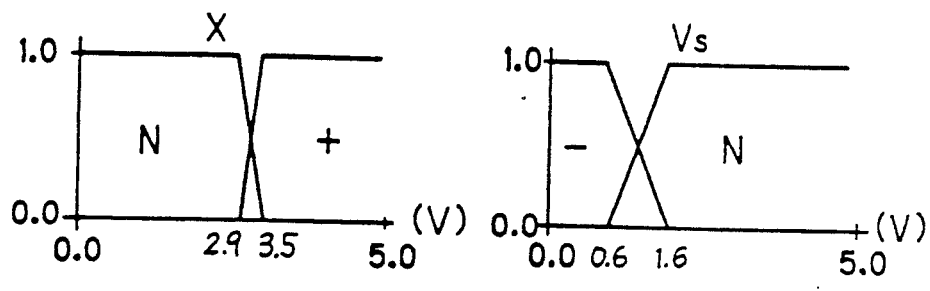
FIGS. 11(A) through 11(C) are diagrams showing membership functions used at the time of "image density low" after correction using the IF method.
Figure 11C:
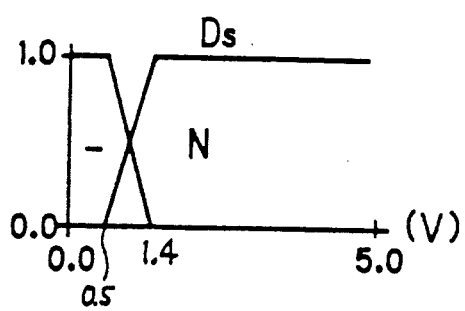

The read values are sent to the membership function generating portion 13. In the membership function generating portion 13, membership functions at the time of "image density low" are respectively generated by using as landmarks the values of the sensors at the time when an image is normal which are read in the step S21 and the values of the sensors at the time when an image is lightly printed which are read in the step S29. As a result, the membership functions at the time of "image density low" as shown in FIGS. 5(A) through 5(C) are corrected to membership functions as shown in FIGS. 11(A) through 11(C).

Although description was made of the foregoing IF method by taking as an example a case where membership functions respectively serving as landmarks are corrected, landmarks defined in a qualitative quantity space may be respectively not membership functions but particular values. In the case, if the IF method is used, the particular landmarks are corrected in the following manner.

For example, it is assumed that landmarks defined in the qualitative quantity space before the fault repair are landmarks shown in FIG. 12. As can be seen from FIG. 12, the detected quantitative value of the light quantity sensor X is converted into a qualitative value which is low (−) when it is less than 2.5 (V), is converted into a qualitative value which is normal (N) when it is not less than 2.5 (V) and less than 3.5 (V), and is converted into a qualitative value which is high (+) when it is not less than 3.5 (V). Similarly, according to the landmarks, the detected quantitative value of the surface potential sensor Vs is converted into a qualitative value which is low (−) when it is less than 0.5 (V), is converted into a qualitative value which is normal (N) when it is not less than 0.5 (V) and less than 2.7 (V), and is converted into a qualitative value which is high (+) when it is not less than 2.7 (V). In addition, the detected quantitative value of the toner density sensor Ds is converted into a qualitative value which is low (−) when it is less than 0.5 (V), is converted into a qualitative value which is normal (N) when it is not less than 0.5 (V) and less than 2.1 (V), and is converted into a qualitative value which is high (+) when it is not less than 2.1 (V).

Consider a case where landmarks for respectively converting the detected values of the sensors in the image forming apparatus into the qualitative values are as shown in FIG. 12. In this case, if the above described IF method shown in FIG. 9 is carried out, the landmarks shown in FIG. 12 are corrected to landmarks shown in FIG. 13.

Figure 13:
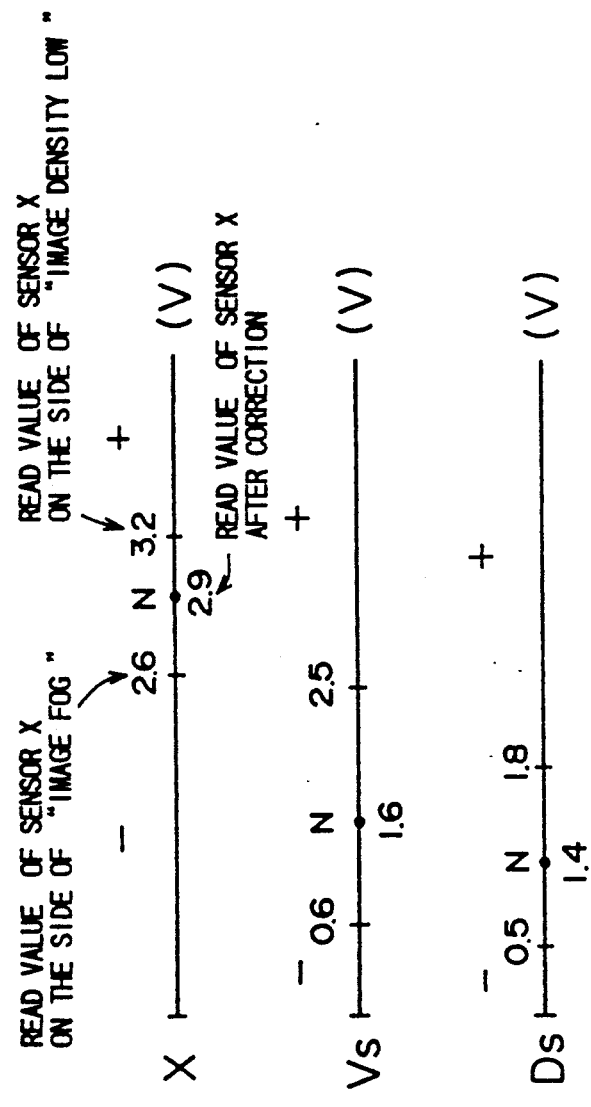
FIG. 13 is a diagram showing one example of landmarks (which respectively use no membership functions) after correction using the IF method.

In FIG. 13, if the landmark of the light quantity sensor X is taken as an example, 2.9 (V) is a value of the light quantity sensor X after the fault repair which is read in the step S21 shown in FIG. 9. On the other hand, 2.6 (V) is a value of the light quantity sensor X which is read in the step S25 shown in FIG. 9, that is, a read value of the light quantity sensor X at the time point where a fault symptom "image fog" is forced to appear on the electrophotographic copying machine using the IF method. In addition, 3.2 (V) is a value of the light quantity sensor X which is read in the step S29 shown in FIG. 9, that is, a read value of the light quantity sensor X at the time point where a fault symptom "image density low" is forced to appear on the electrophotographic copying machine after the fault repair using the IF method.

Therefore, the landmarks shown in FIG. 13 after the correction using the IF method are corrected in conformity with the electrophotographic copying machine after the fault repair. Accordingly, even if the landmarks are not respectively defined using membership functions, the landmarks are dynamically corrected every time the fault developed by the electrophotographic copying machine is repaired to conform to the electrophotographic copying machine after the fault repair.

The same is true for the surface potential sensor Vs and the toner density sensor Ds shown in FIG. 13.

The above described IF method may be not only carried out after the fault repair succeeded but also carried out in response to manual input of an IF method execution signal by a service man or the like.

The present invention is not limited to the above described embodiment. Various modifications can be made on the basis of the claims.

Although in the above described embodiment, description was made by taking as an example a small-sized electrophotographic copying machine, the control device according to the present invention is also applicable to a case where the other image forming apparatus such as a laser beam printer or a facsimile is a controlled object.

Furthermore, the present embodiment consistently describes, assuming that a fault symptom appears when a copy image obtained is not finished neatly in the electrophotographic copying machine, an apparatus for self-diagnosing a fault which is the cause of the appearance of the fault symptom. However, the present invention is also applicable to self-diagnosis and self-maintenance of faults of the electrophotographic copying machine other than the fault concerning the finish of the copy image.

Various modification other than the foregoing can be further made.

While there has been illustrated and described what is at present considered to be a preferred embodiment of the present invention, it will be understood by those skilled in the art that various changes and modifications may be made, and equivalents may be substituted for elements thereof without departing from the true scope of the invention. It is intended that this invention not be limited to the particular embodiment disclosed as the best mode contemplated for carrying out the invention, but that the invention will include all embodiments falling within the scope of the appended claims.

What is claimed is:

1. An image forming apparatus capable of making self-diagnosis of a fault developed by the image forming apparatus, comprising:

virtual case storing means having stored therein a plurality of faults which can be developed by the image forming apparatus and sets of qualitative values of parameters representing the state of each of the faults out of the results obtained by qualitatively expressing said image forming apparatus by a casual relation network of parameters representing the property of the image forming apparatus and qualitative simulating all states which can exist on the image forming apparatus using said casual relation network of parameters when it is assumed that a fault symptom appears on the image forming apparatus;

a plurality of sensors for detecting the states of a predetermined plurality of portions in the image forming apparatus;

landmark storing means having stored therein landmarks in a qualitative quantity space which are respectively defined using fuzzy membership functions and required for converting detected values of the sensors into qualitative values;

converting means for reading the detected values of said respective sensors when the fault symptom actually appears on the image forming apparatus, to convert the detected values of the sensors into fuzzy qualitative values respectively using the membership functions stored in said landmark storing means; and fault specifying means for comparing a set of fuzzy qualitative values obtained by the conversion using said converting means with the sets of qualitative values of parameters representing the state of each of the faults which are stored in said virtual case storing means, to specify the fault represented by the set of qualitative values which is in a predetermined relationship to the set of fuzzy qualitative values as a fault causing the fault symptom actually appearing.

2. The image forming apparatus according to claim 1, wherein
the membership functions stored in said landmark storing means are stored for each fault symptom.

3. The image forming apparatus according to claim 2, wherein
the plurality of faults and the sets of qualitative values of parameters representing the state of each of the faults which are stored in said virtual case storing means are classified and stored for each fault symptom.

4. The image forming apparatus according to claim 3, wherein said fault specifying means defines a three-dimensional qualitative quantity space and compares, in a positional relationship in the qualitative quantity space, the sets of qualitative values of parameters representing the state of each of the faults which are stored in the virtual case storing means with said set of fuzzy qualitative values, to specify the fault represented by the set of qualitative values of parameters which is the nearest from the position of the set of fuzzy qualitative values.

5. The image forming apparatus according to claim 1, which further comprises
fault repairing means for repairing the fault specified by said fault specifying means.

6. The image forming apparatus according to claim 5, wherein
said virtual case storing means further stores repair methods corresponding to the respective faults for each fault.

7. The image forming apparatus according to claim 6, wherein
said repair methods stored comprise a plurality of repair methods assigned priorities.

8. The image forming apparatus according to claim 1, which further comprises
landmark correcting means for correcting the membership functions stored in said landmark storing means respectively using the detected values of said plurality of sensors read when the image forming apparatus is forced to develop the fault at predetermined timing and the detected values of said plurality of sensors read before the image forming apparatus develops the fault.

9. The image forming apparatus according to claim 8, wherein
the timing of forcing the image forming apparatus to develop the fault in order for said landmark correcting means to correct the membership functions is timing for each completion of the repair of the fault by said fault repairing means.

10. The image forming apparatus according to claim 8, wherein
the timing of forcing the image forming apparatus to develop the fault in order for said landmark correcting means to correct the membership functions is timing for each input of a correction request signal by a manual operation or the like.

11. The image forming apparatus according to claim 8, wherein
the membership functions stored in said landmark storing means are stored for each fault symptom.

12. The image forming apparatus according to claim 11, wherein
the plurality of faults and the sets of qualitative values of parameters representing the state of each of the faults which are stored in said virtual case storing means are classified and stored for each fault symptom.

13. The image forming apparatus according to claim 12, wherein
said fault specifying means defines a three-dimensional qualitative quantity space and compares, in a positional relationship in the qualitative quantity space, the sets of qualitative values of parameters representing the state of each of the faults which are stored in the virtual case storing means with said set of fuzzy qualitative values, to specify the fault represented by the set of qualitative values of parameters which is the nearest from the position of the set of fuzzy qualitative values.

14. The image forming apparatus according to claim 8, which further comprises
fault repairing means for repairing the fault specified by said fault specifying means.

15. The image forming apparatus according to claim 14, wherein
said virtual case storing means further stores repair methods corresponding to the respective faults for each fault.

16. The image forming apparatus according to claim 15, wherein
said repair methods stored comprise a plurality of repair methods assigned priorities.

17. An image forming apparatus capable of making self-diagnosis of a fault developed by the image forming apparatus, comprising:
outputting means for outputting, as a plurality of faults and a plurality of sets of qualitative values of parameters representing the state of each of the faults, the results obtained by qualitatively expressing said image forming apparatus by a casual relation network of parameters representing the property of the image forming apparatus and qualitatively simulating all states which can exist on the image forming apparatus using said casual relation network of parameters when it is assumed that a fault symptom appears on the image forming apparatus;
a plurality of sensors for detecting the states of a predetermined plurality of portions in the image forming apparatus;
landmark storing means having stored therein landmarks in a qualitative quantity space which are respectively defined using fuzzy membership functions and required for converting detected values of the sensors into qualitative values;
converting means for reading the detected values of said respective sensors when the fault symptom actually appears on the image forming apparatus, to convert the detected values of the sensors into fuzzy qualitative values respectively using the membership functions stored in said landmark storing means; and
fault specifying means for comparing a set of fuzzy qualitative values obtained by the conversion using said converting means with the plurality of sets of qualitative values of parameters representing the state of each of the faults which are outputted from said outputting means, to specify the fault represented by the set of qualitative values which is in a predetermined relationship to the set of fuzzy qualitative values as a fault causing the fault symptom actually appearing.

18. The image forming apparatus according to claim 17, wherein
the membership functions stored in said landmark storing means are stored for each fault symptom.

19. The image forming apparatus according to claim 18, wherein
said fault specifying means defines a three-dimensional qualitative quantity space and compares, in a positional relationship in the qualitative quantity space, the plurality of sets of qualitative values with said set of fuzzy qualitative values, to specify the fault represented by the set of qualitative values which is the nearest from the position of the set of fuzzy qualitative values.

20. The image forming apparatus according to claim 17, which further comprises
landmark correcting means for correcting the membership functions stored in said landmark storing means respectively using the detected values of said plurality of sensors read when the image forming apparatus is forced to develop the fault at predetermined timing and the detected values of said plurality of sensors read before the image forming apparatus develops the fault.

21. The image forming apparatus according to claim 20, which further comprises
fault repairing means for repairing the fault specified by said fault specifying means.

22. The image forming apparatus according to claim 21, wherein
the timing of forcing the image forming apparatus to develop the fault in order for said landmark correcting means to correct the membership functions is timing for each completion of the repair of the fault by said fault repairing means.

23. The image forming apparatus according to claim 21, wherein
the timing of forcing the image forming apparatus to develop the fault in order for said landmark correcting means to correct the membership functions is timing for each input of a correction request signal by a manual operation or the like.

24. The image forming apparatus according to claim 20, wherein
the membership functions stored in said landmark storing means are stored for each fault symptom.

25. The image forming apparatus according to claim 24, wherein
said fault specifying means defines a three-dimensional qualitative quantity space and compares, in a positional relationship in the qualitative quantity space, the plurality of sets of qualitative values with said set of fuzzy qualitative values, to specify the fault represented by the set of qualitative values which is the nearest from the position of the set of fuzzy qualitative values.

26. In a control device for converting detected values obtained from an image forming apparatus which is a controlled object into qualitative values to carry out predetermined control using the qualitative values obtained by the conversion, the control device is characterized by comprising:
landmark storing means having stored therein landmarks in a qualitative quantity space which are respectively required in converting said detected values into the qualitative values;
landmark correcting means for correcting the landmarks stored in said landmark storing means respectively using at least the detected values obtained when the image forming apparatus is forced to develop the fault at predetermined timing; and
converting means for converting the detected values obtained from the image forming apparatus into the qualitative values respectively using the landmarks corrected.

27. The control device according to claim 26, wherein
said landmark correcting means corrects the landmarks respectively using the detected values obtained when the image forming apparatus develops the fault and the detected values obtained before the image forming apparatus develops the fault.

28. The control device according to claim 27, wherein
said landmarks are respectively defined by fuzzy membership functions.

29. The control device according to claim 26, which further comprises
fault repairing means for repairing the fault developed by the image forming apparatus, and wherein
the timing of forcing the image forming apparatus to develop the fault in order for said landmark correcting means to correct the landmarks is timing for each completion of the repair of the fault by said fault repairing means.

30. The control device according to claim 26, wherein
the timing of forcing the image forming apparatus to develop the fault in order for said landmark correcting means to correct the landmarks is timing for each input of a correction request signal by a manual operation or the like.

31. The control device according to claim 26, wherein
said image forming apparatus is provided with a plurality of sensors for detecting the states of a predetermined plurality of portions, and
said detected values are respectively applied from the plurality of sensors.

32. An image forming apparatus capable of making self-diagnosis of a fault developed by the image forming apparatus, comprising:
outputting means for outputting, when it is assumed that a fault symptom appears on the image forming apparatus, a plurality of faults causing the fault symptom and a plurality of sets of qualitative values of parameters representing the state of each of the faults;
a plurality of sensors for detecting the states of a predetermined plurality of portions in the image forming apparatus;
landmark storing means having stored therein landmarks in a qualitative quantity space which are respectively defined using fuzzy membership functions and required for converting detected values of the sensors into qualitative values;
landmark correcting means for correcting the landmarks stored in said landmark storing means respectively using the detected values of said plurality of sensors read when the image forming apparatus is forced to develop the fault at predetermined timing;
converting means for reading the detected values of said plurality of sensors when the fault symptom actually appears on the image forming apparatus, to convert the detected values of the sensors into the qualitative values respectively using the landmarks stored in said landmark storing means; and
fault specifying means for comparing a set of qualitative values obtained by the conversion using said converting means with the plurality of sets of qualitative values corresponding to the plurality of faults which are outputted from said outputting means, to specify a fault causing the fault symptom actually appearing.

33. The image forming apparatus according to claim 32, which further comprises fault repairing means for repairing the fault specified by said fault specifying means.

34. The image forming apparatus according to claim 33, wherein
the timing of forcing the image forming apparatus to develop the fault in order for said landmark correcting means to correct the landmarks is timing for each completion of the repair of the fault by said fault repairing means.

35. The image forming apparatus according to claim 33, wherein
the timing of forcing the image forming apparatus to develop the fault in order for said landmark correcting means to correct the landmarks is timing for each input of a correction request signal by a manual operation or the like.

36. An image forming apparatus capable of making self-diagnosis of a fault developed by the image forming apparatus, comprising:
virtual case storing means having stored therein, when it is assumed that a fault symptom appears on the image forming apparatus, a plurality of faults causing the fault symptom and a plurality of sets of qualitative values of parameters representing the state of each of the faults;
a plurality of sensors for detecting the states of a predetermined plurality of portions in the image forming apparatus;
landmark storing means having stored therein landmarks in a qualitative quantity space which are respectively defined using fuzzy membership functions and required for converting detected values of the sensors into qualitative values;
landmark correcting means for correcting the landmarks stored in said landmark storing means respectively using the detected values of said plurality of sensors read when the image forming apparatus is forced to develop the fault at predetermined timing;
converting means for reading the detected values of said plurality of sensors when the fault symptom actually appears on the image forming apparatus, to convert the detected values of the sensors into the qualitative values respectively using the landmarks stored in said landmark storing means; and
fault specifying means for comparing a set of qualitative values obtained by the conversion using said converting means with the plurality of sets of qualitative values which are stored in said virtual case storing means, to specify a fault causing the fault symptom actually appearing.

37. The image forming apparatus according to claim 36, which further comprises
fault repairing means for repairing the fault specified by said fault specifying means.

38. The image forming apparatus according to claim 37, wherein
the timing of forcing the image forming apparatus to develop the fault in order for said landmark correcting means to correct the landmarks is timing for each completion of the repair of the fault by said fault repairing means.

39. The image forming apparatus according to claim 37, wherein
the timing of forcing the image forming apparatus to develop the fault in order for said landmark correcting means to correct the landmarks is timing for each input of a correction request signal by a manual operation or the like.

40. The image forming apparatus according to claim 37, wherein
said virtual case storing means further stores repair methods corresponding to the faults.

* * * * *